(12) United States Patent
Kim et al.

(10) Patent No.: US 11,302,478 B2
(45) Date of Patent: Apr. 12, 2022

(54) MULTILAYER CERAMIC CAPACITOR

(71) Applicant: SAMSUNG ELECTRO-MECHANICS CO., LTD., Suwon-Si (KR)

(72) Inventors: Byung Gyun Kim, Suwon-Si (KR); Ji Hong Jo, Suwon-Si (KR); Jong Ho Lee, Suwon-Si (KR); Myung Jun Park, Suwon-Si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 42 days.

(21) Appl. No.: 16/197,734

(22) Filed: Nov. 21, 2018

(65) Prior Publication Data

US 2020/0082984 A1 Mar. 12, 2020

(30) Foreign Application Priority Data

Sep. 6, 2018 (KR) .......................... 10-2018-0106590

(51) Int. Cl.
| | |
|---|---|
| *H01G 4/232* | (2006.01) |
| *H01G 4/30* | (2006.01) |
| *H01G 4/012* | (2006.01) |
| *H01G 4/248* | (2006.01) |
| *H01G 4/008* | (2006.01) |
| *H01G 4/12* | (2006.01) |

(52) U.S. Cl.
CPC .......... *H01G 4/2325* (2013.01); *H01G 4/012* (2013.01); *H01G 4/248* (2013.01); *H01G 4/30* (2013.01); *H01G 4/0085* (2013.01); *H01G 4/1227* (2013.01)

(58) Field of Classification Search
CPC .......... H01G 4/30; H01G 4/232; H01G 4/248; H01G 4/2325; H01G 4/012; H01G 4/1227
USPC .......... 361/321.1, 321.2, 301.4, 306.3, 321.3
See application file for complete search history.

(56) References Cited

U.S. PATENT DOCUMENTS

| | | |
|---|---|---|
| 9,437,365 B2 | 9/2016 | Saito et al. |
| 10,622,152 B2 | 4/2020 | Kogure et al. |
| 2005/0254197 A1 | 11/2005 | Murosawa et al. |

(Continued)

FOREIGN PATENT DOCUMENTS

| | | |
|---|---|---|
| CN | 103971930 A | 8/2014 |
| CN | 104093888 A | 10/2014 |

(Continued)

OTHER PUBLICATIONS

Office Action issued in corresponding Korean Patent Application No. 10-2018-0106590 dated Jul. 12, 2019.

(Continued)

*Primary Examiner* — Arun Ramaswamy
(74) *Attorney, Agent, or Firm* — Morgan, Lewis & Bockius LLP

(57) ABSTRACT

A multilayer ceramic capacitor includes a body including a dielectric layer and an internal electrode and an external electrode disposed on an exterior of the body. The external electrode includes an electrode layer connected to the internal electrode and a plating portion including a nickel (Ni) plating layer, a nickel-tin (Ni—Sn) intermetallic compound layer, and a tin (Sn) plating layer, sequentially disposed on the electrode layer. The Ni—Sn intermetallic compound layer has a thickness of 0.1 μm or more.

24 Claims, 7 Drawing Sheets

(56) References Cited

U.S. PATENT DOCUMENTS

| | | | |
|---|---|---|---|
| 2013/0258546 A1 | 10/2013 | Kim et al. | |
| 2014/0041913 A1* | 2/2014 | Yanagida | H05K 1/18 174/260 |
| 2014/0204502 A1 | 7/2014 | Chun et al. | |
| 2014/0321025 A1 | 10/2014 | Saito et al. | |
| 2015/0054388 A1* | 2/2015 | Itagaki | H01C 7/008 310/364 |
| 2016/0268046 A1* | 9/2016 | Nishisaka | H01G 4/12 |
| 2017/0011851 A1* | 1/2017 | Yoon | H01G 4/1227 |
| 2017/0330689 A1 | 11/2017 | Hatanaka et al. | |
| 2018/0108482 A1 | 4/2018 | Kogure et al. | |

FOREIGN PATENT DOCUMENTS

| | | |
|---|---|---|
| CN | 107958782 A | 4/2018 |
| JP | H05-3131 A | 1/1993 |
| JP | 2012-199597 A | 10/2012 |
| KR | 10-0683542 B1 | 2/2007 |
| KR | 10-2013-0111000 A | 10/2013 |
| KR | 10-2014-0106733 A | 9/2014 |
| KR | 10-2018-0042125 A | 4/2018 |
| KR | 10-2018-0064349 A | 6/2018 |
| WO | 2016-098702 A1 | 6/2016 |

OTHER PUBLICATIONS

Korean Office Action dated Jan. 9, 2020 issued in Korean Patent Application No. 10-2018-0106590 (with English translation).
Office Action issued in corresponding Chinese Patent Application No. 201910144477.X dated Jan. 28, 2022.

\* cited by examiner

MULTILAYER CERAMIC CAPACITOR

CROSS-REFERENCE TO RELATED APPLICATION(S)

This application claims benefit of priority to Korean Patent Application No. 10-2018-0106590 filed on Sep. 6, 2018 in the Korean Intellectual Property Office, the disclosure of which is incorporated herein by reference in its entirety.

TECHNICAL FIELD

The present disclosure relates to a multilayer ceramic capacitor.

BACKGROUND

A multilayer ceramic capacitor (MLCC) is an important chip component used in industrial fields such as communications, computing, home appliances, automobile manufacturing, and the like, due to advantages thereof, such as compactness, high capacitance, and ease of mounting. In detail, an MLCC is a core passive component used in electric, electronic, and information communications devices such as mobile phones, computers, digital TVs, and the like.

With the recent increasing demand for mobile devices, wearable devices, and the like, it is becoming increasingly important to ensure moisture-resistance reliability of a multilayer ceramic capacitor for use in various climates and environments.

In general, a nickel (Ni) plating layer and a tin (Sn) plating layer are plated on an electrode layer of an external electrode to secure moisture resistance. As a dielectric layer, an internal electrode, and a cover portion are decreased in thickness with miniaturization of a multilayer ceramic capacitor with high capacitance, there is need to further improve moisture-resistance reliability.

SUMMARY

An aspect of the present disclosure is to provide a multilayer ceramic capacitor having excellent moisture-resistance reliability.

According to an aspect of the present disclosure, a multilayer ceramic capacitor includes a body including a dielectric layer and an internal electrode, and an external electrode disposed on an exterior of the body. The external electrode includes an electrode layer connected to the internal electrode and a plating portion including a nickel (Ni) plating layer, a nickel-tin (Ni—Sn) intermetallic compound layer, and a tin (Sn) plating layer, sequentially disposed on the electrode layer. The Ni—Sn intermetallic compound layer has a thickness of 0.1 µm or more.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Hereinafter, exemplary embodiments in the present disclosure will be described in detail, with reference to the accompanying drawings, where those components are rendered using the same reference number that are the same or are in correspondence, regardless of the figure number, and redundant explanations are omitted.

The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

Terms used in the present specification are for explaining the embodiments rather than limiting the present disclosure. Unless explicitly described to the contrary, a singular form includes a plural form in the present specification. The word "comprise" and variations such as "comprises" or "comprising," will be understood to imply the inclusion of stated constituents, steps, operations and/or elements but not the exclusion of any other constituents, steps, operations and/or elements.

In drawings, X direction may be defined as second direction, L direction or length direction, Y direction may be defined as third direction, W direction or width direction, and Z direction may be defined as first direction, laminated direction, T direction or thickness direction.

Multilayer Ceramic Capacitor

Figure 1:
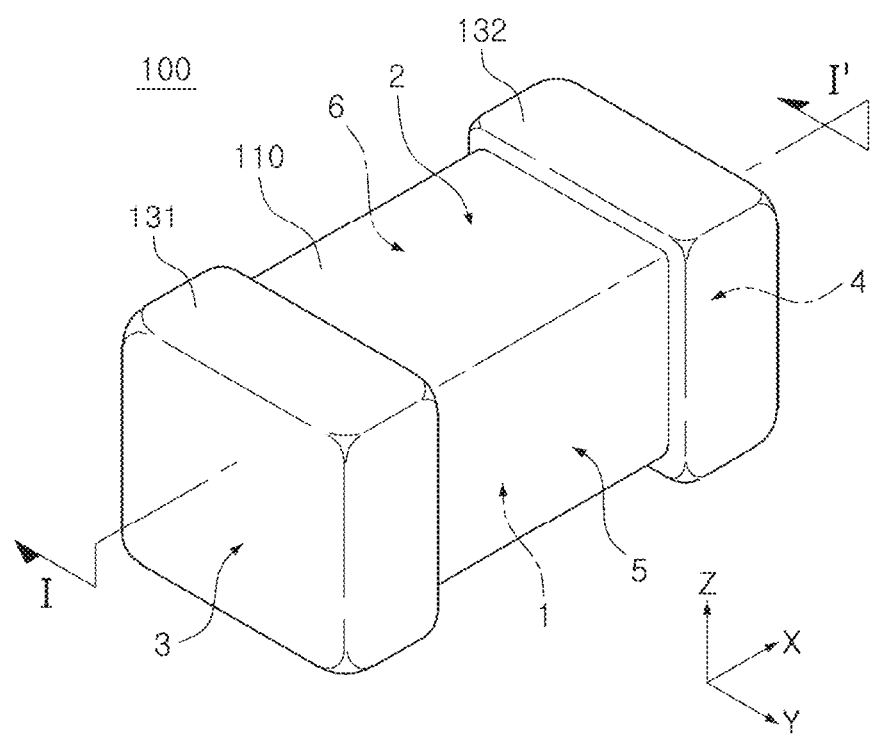
FIG. 1 is a perspective view of a multilayer ceramic capacitor according to an exemplary embodiment in the present disclosure.

FIG. 1 is a perspective view of a multilayer ceramic capacitor according to an exemplary embodiment in the present disclosure.

Figure 2:
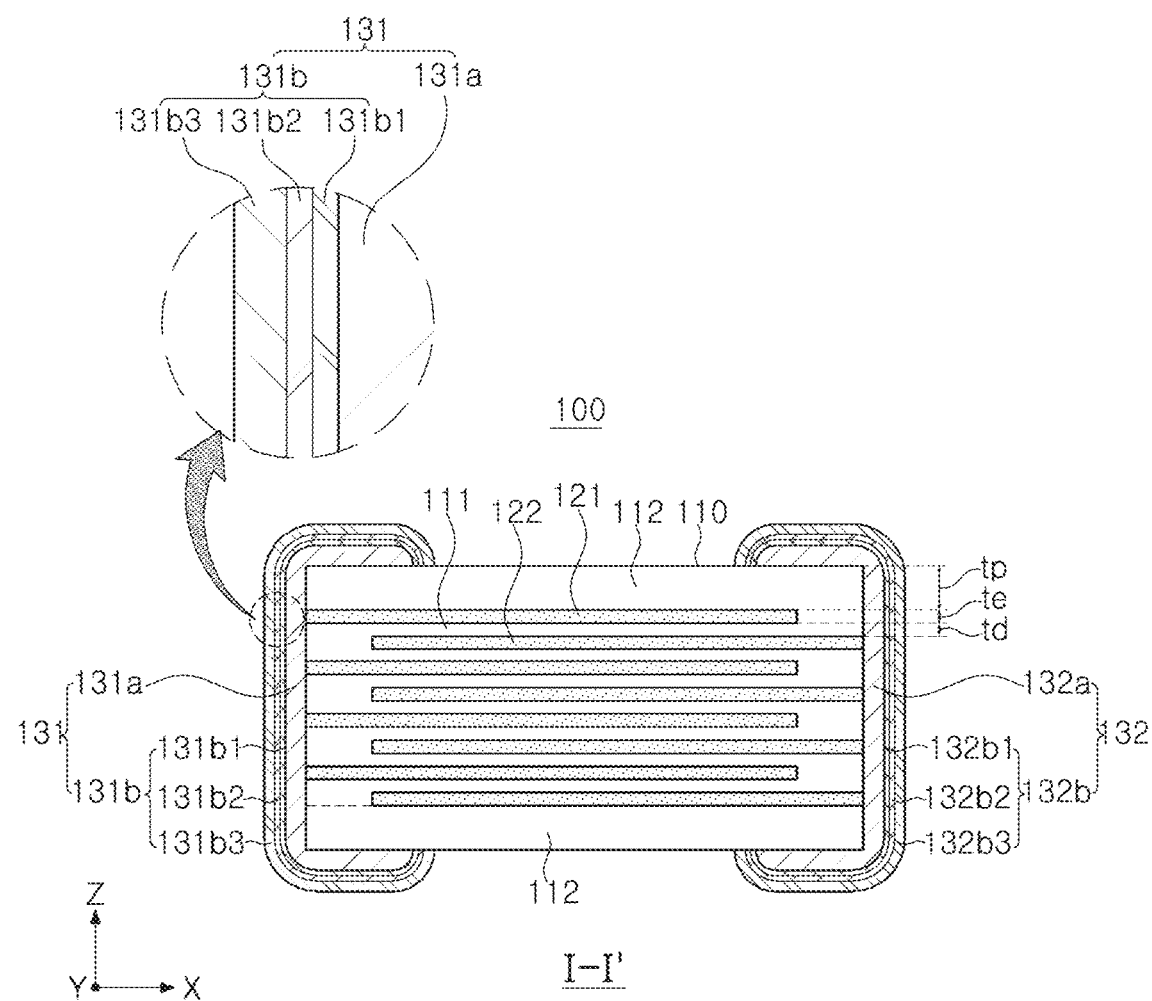
FIG. 2 is a cross-sectional view taken along line I-I' in FIG. 1.

FIG. 2 is a cross-sectional view taken along line I-I' in FIG. 1.

Figure 3:
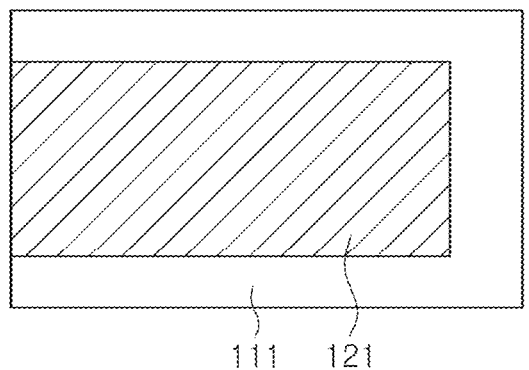
FIG. 3 illustrates a ceramic green sheet on which an internal electrode is printed to fabricate a body of a multilayer ceramic capacitor.
Figure 3:
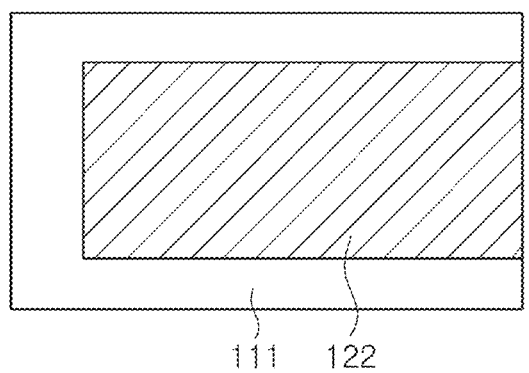

FIG. 3 illustrates a ceramic green sheet on which an internal electrode is printed to fabricate a body of a multilayer ceramic capacitor.

Referring to FIGS. 1 to 3, a multilayer ceramic capacitor 100 according to an exemplary embodiment includes a body 110 including a dielectric layer 111 and internal electrodes 121 and 122 and external electrodes 131 and 132. The external electrodes 131 and 132 include electrode layers 131a and 132a and plating portions 131b and 132b including nickel (Ni) plating layers 131b1 and 132b1, nickel-tin (Ni—Sn) intermetallic compound layers 131b2 and 132b2, and tin (Sn) layers 131b3 and 132b3 sequentially laminated on the electrode layers 131a and 132a, respectively. Each of the Ni—Sn intermetallic compound layers 131b2 and 132b2 has a thickness of 0.1 µm or more.

In the body 110, the dielectric layer 111 and the internal electrodes 121 and 122 are alternately laminated.

As shown in the drawings, the body 100 may have a hexahedral shape or a similar shape, but the shape of the body 100 is not limited thereto. Shrinkage of ceramic powders included in the body 110 during a sintering process may cause the body 110 to have a substantially hexahedral shape rather than a shape of a hexahedron having entirely straight lines.

The body may have first and second surfaces 1 and 2 disposed to oppose each other in a thickness direction (a Z direction), third and fourth surfaces 3 and 4 connected to the first and second surfaces 1 and 2 and disposed to oppose to each other in a length direction (an X direction), and fifth and sixth surfaces 5 and 6 connected to the first and second surfaces 1 and 2 as well as the third and fourth surfaces 3 and 4 and disposed to oppose each other in a width direction (a Y direction).

A plurality of dielectric layers 111 forming the body 110 are in a sintered state. Adjacent dielectric layers 111 may be integrated with each other such that boundaries therebetween may not be readily apparent without using a scanning electron microscope (SEM).

Any material may be used to form the dielectric layer 111 as along as sufficient capacitance can be obtained therewith. For example, a material of the dielectric layer may be a barium titanate ($BaTiO_3$)-based powder. In addition to a powder such as barium titanate ($BaTiO_3$), a ceramic additive, an organic solvent, a plasticizer, a binder, and a dispersant may be further added to the dielectric layer 111 according to objectives of the present disclosure.

On the other hand, a thickness of the dielectric layer 111 does not need to be limited.

However, when a dielectric layer is provided to have a small thickness of 0.6 μm or less, for example, 0.4 μm or less, moisture-resistance reliability may be degraded.

As will be described below, according to an exemplary embodiment, the Ni—Sn intermetallic compound 131$b$2 and 132$b$ having a thickness of 0.1 μm or more are respectively provided between the Ni plating layer 131$b$1 and 132$b$1 and the Sn plating layers 131$b$3 and 132$b$3 to improve moisture-resistance reliability. Thus, sufficient moisture-resistance reliability even when the dielectric layer has a thickness of 0.4 μm or less.

Accordingly, moisture-resistance reliability may be significantly improved when the dielectric layer 111 has a thickness of 0.4 μm or less.

The thickness of the dielectric layer 111 may refer to an average thickness of the dielectric layer 111 provided between the first and second internal electrodes 121 and 122.

The average thickness of the dielectric layer 111 may be measured by scanning a cross section in length-thickness directions (L-T cross section) of the body 110, using a scanning electron microscope (SEM).

For example, the average thickness of the dielectric layer 110 may be obtained by measuring the thicknesses at 30 equidistant points in a length direction, on an image of any dielectric layer 111, extracted from the image obtained by scanning a cross section in length-thickness directions (L-T), cut in a central portion in a width direction W of the body 110 and averaging the measured thickness values.

The 30 equidistant points may be measured in a capacitance forming portion that refers to a region in which the first and second internal electrodes 121 and 122 overlap each other.

In this case, the multilayer ceramic capacitor 100 includes the first internal electrode 121 and the second internal electrode 122 disposed inside the body 110 and disposed to oppose each other with the dielectric layer 111 interposed therebetween. Thus, the multilayer ceramic capacitor 100 may include a capacitance forming portion in which capacitance is formed and cover portions 112 respectively disposed above and below the capacitance forming portion.

The cover portion 112 does not include an internal electrode and may include the same material as the dielectric layer 111. As an example, the cover portion 112 may include a ceramic material, for example, a barium titanate ($BaTiO_3$)-based ceramic material.

The cover portion 112 may be formed by vertically laminating a single dielectric layer or two or more dielectric layers on top and bottom surfaces of the capacitance forming portion. The cover portion 112 may basically serve to prevent damage of an internal electrode caused by a physical or chemical stress.

There is no need to limit a thickness tp of the cover portion 112. However, the thickness tp of the cover portion 112 may be 20 μm or less to readily achieve miniaturization and high capacitance of the multilayer ceramic capacitor 100. In this case, since a moisture permeation path is reduced, moisture-resistance reliability may be degraded.

As it will be described below, according to an exemplary embodiment, the moisture-resistance reliability may be improved by providing the Ni—Sn intermetallic compound layers 131$b$2 and 132$b$2 between the Ni plating layers 131$b$1 and 132$b$1 and the Sn plating layers 131$b$3 and 132$b$3. Thus, sufficient moisture-resistance reliability may be secured even when the thickness tp of the cover portion 112 is 20 μm or less.

Accordingly, moisture-resistance reliability may be significantly improved when the cover portion has a thickness of 20 μm or less.

The internal electrodes 121 and 122 may be alternately laminated with a dielectric layer and may include first and second internal electrodes 121 and 122. The first and second internal electrodes 121 and 122 may be alternately disposed to oppose each other with the dielectric layer 111, constituting the body 110, interposed therebetween and may be exposed to the third and fourth surfaces 3 and 4 of the body 110, respectively.

Referring to FIG. 2, the first internal electrode 121 may be spaced apart from the fourth surface 4 and exposed through the third surface 3, and the second internal electrode 122 may spaced apart from the third surface 3 and may be exposed through the fourth surface 4.

The first and second internal electrodes 121 and 122 may be electrically separated from each other by a dielectric layer 111 interposed therebetween. Referring to FIG. 3, the body 110 may be formed by alternately laminating a ceramic green sheet on which the internal electrode 121 is printed and a ceramic green sheet on which the second internal electrode 122 is printed and sintering the alternately laminated ceramic green sheets.

The first and second internal electrodes 121 and 122 may be formed using a conductive paste formed of at least one of a noble metal material such as palladium (Pd) and a palladium-silver (Pd—Ag) alloy, nickel (Ni), and copper (Cu), but a material thereof is not limited thereto.

The conductive paste may be printed by means of a screen printing method, a gravure printing method, or the like, but the printing method is not limited thereto.

There is no need to limit the thickness of the first and second internal electrodes 121 and 122. However, the thickness to of the first and second internal electrodes 121 and 122 may 0.4 μm or less to achieve miniaturization and high capacitance of the multilayer ceramic capacitor 100. The thickness of the first and second internal electrodes 121 and 122 may refer to an average thickness of the first and second internal electrodes 121 and 122.

The average thickness of the first and second internal electrodes 121 and 122 may be measured by scanning a cross section in length-thickness directions (L-T cross section) of the body 110 using a scanning electron microscope (SEM).

For example, the average thickness of the dielectric layer 110 may be obtained by measuring the thicknesses at 30 equidistant points in a length direction, on an image of any first and second internal electrodes 121 and 112 dielectric layer 50, extracted from the image obtained by scanning a cross section in length-thickness directions (L-T), cut in a central portion in a width direction W of the body 110 and averaging the measured thickness values.

The 30 equidistant points may be measured in a capacitance forming portion that refers to a region in which the first and second internal electrodes 121 and 122 overlap each other.

The external electrodes 131 and 132 are disposed in the body 110 and include electrode layers 131a and 132a and plating portions 131b and 132b.

The external electrodes 131 and 132 may include first and second external electrodes 131 and 132, respectively connected to the first and second internal electrodes 121 and 122.

The first and second external electrodes 131 and 132 may extend from the third and fourth surfaces 3 and 4 of the body 110 to portions of the first and second surfaces 1 and 2 of the body 110, respectively. Also the first and second external electrodes 131 and 132 may extend from the third and fourth surfaces 3 and 4 of the body 110 to portions of the fifth and sixth surfaces 5 and 6 of the body 110, respectively.

The electrode layers 131a and 132a serve to mechanically bond the body 110 and the external electrodes 131 and 132 to each other and serve to electrically and mechanically bond the internal electrodes 121 and 122 and the external electrodes 131 and 132 to each other.

The electrode layers 131a and 132a may be formed of any material, such as a metal, as long as it has electrical conductivity. A detailed material of the electrode layers 131a and 132a may be determined considering electrical characteristics, structural stability, and the like.

For example, the electrode layers 131a and 132a may be a sintered electrode including a conductive metal and a glass or a resin-based electrode including a conductive metal and a base resin.

The electrode layers 131a and 132a may be formed by means of atomic layer deposition (ALD), molecular layer deposition (MLD), chemical vapor deposition (CVD), sputtering, or the like.

However, in the case in which the electrode layers 131a and 132a are sintered electrodes including a conductive metal and a glass, moisture-resistance reliability may be improved more effectively.

The electrode layers 131a and 132a may include a connection portion disposed on the third surface 3 or the fourth surface 4 of the body 110 and a band portion extending from the connection portion to portions of the first, second, fifth, and sixth surfaces 1, 2, 5, and 6. In the case in which the electrode layers 131a and 132a is a sintered electrode including a conductive metal and a glass, a corner portion at which the connection portion and the band portion meet may be disposed to have a small thickness or lift-up may occur between ends of the body 110 and the band portion. Thus, moisture-resistance reliability may be degraded.

The glass serves to mechanically bond the body 110 and the external electrodes 131 and 132 to each other, and the conductive metal serves to electrically and mechanically bond the internal electrodes 121 and 122 and the external electrodes 131 and 132 to each other. The conductive metal may be copper (Cu).

The plating portions 131b and 132b may include nickel (Ni) plating layers 131b1 and 132b1, nickel-tin (Ni—Sn) intermetallic layers 131b2 and 132b2, and tin (Sn) plating layers 131b3 and 132b3 sequentially laminated on an electrode layer, respectively. Each of the Ni—Sn intermetallic compound layers 131b2 and 132b2 may have a thickness of 0.1 µm or more.

The Ni—Si intermetallic compound (IMC) layers 131b2 and 132b2 serves to improve bonding force between the Ni plating layers 131b1 and 132b1 and the Sn plating layers 131b3 and 132b3 and to improve moisture-resistance reliability.

In the case in which each of the Ni—Si intermetallic compound layers 131b2 and 132b2 has a thickness of 0.1 µm or less, the moisture-resistance reliability may not be sufficiently secured.

It is not necessary to limit an upper limit of the thickness of each of the Ni—Si intermetallic compound layers 131b2 and 132b2. However, when the thickness of each of the Ni—Si intermetallic compound layers 131b2 and 132b2 is too great, the multilayer ceramic capacitor may increase in volume. Since capacitance per unit volume may be reduced to act as a disadvantage to miniaturization and high capacitance, each of the Ni—Si intermetallic compound layers 131b2 and 132b2 may have a thickness of 5 µm or less.

There is no need to limit a method of forming the Ni—Sn intermetallic compound layers 131b2 and 132b2. For example, the Sn—Ni intermetallic compound layers 131b2 and 132b2 may be formed by interdiffusing Sn and Ni on boundaries between the Ni Plating layers 131b1 and 132b1 and the Sn plating layers 131b3 and 132b3 during a separate annealing or reflow process.

Each of the Ni plating layers 131b1 and 132b1 and the Sn plating layers 131b3 and 132b3 may be a conventional plating portion, but is not limited thereto. However, when a Sn—Ni intermetallic compound layer is formed by Sn and Ni on boundaries between the Ni Plating layers 131b1 and 132b1 and the Sn plating layers 131b3 and 132b3, a thickness of each of the Ni plating layers 131b1 and 132b1 and the Sn plating layers 131b3 and 132b3 may be reduced to be slightly smaller than a thickness of the conventional plating portion. For example, the thickness of the Ni plating layers 131b1 and 132b may range from 0.5 µm to 10 µm, and the thickness of the Sn plating layers 131b3 and 132b3 may range from 0.5 µm to 10 µm.

Tables (1), (2), and (3) show test results to confirm a moisture-resistance reliability improvement effect achieved by Ni—Sn intermetallic compound (IMC) layer.

Table (1) shows moisture-resistance reliability evaluated by varying thicknesses of a dielectric layer and a Ni—Sn IMC layer.

Table (2) shows moisture-resistance reliability evaluated by varying thicknesses of an internal electrode and a Ni—Sn IMC layer.

Table (3) shows moisture-resistance reliability evaluated by varying thicknesses of a cover portion and a Ni—Sn IMC layer.

After a body was prepared in such a manner that the dielectric layer 111, the internal electrodes 121 and 122, and the cover portion 112 have thicknesses shown in Tables (1), (2), and (3), a paste including copper (Cu) powders and a glass was coated on both surfaces in a length direction of the body. The coated paste was sintered to form an electrode layer. A Ni plating layer and a Sn plating layer were formed on the electrode layer. Then, a Ni—Sn IMC layer was formed to have the same thickness as shown in Tables (1), (2), and (3).

A moisture-resistance reliability test was performed on 400 samples. Test results are shown in Tables (1), (2), and (3).

In detail, the moisture-resistance reliability test was performed on 400 samples at a temperature of 85 degrees Celsius and at a relative humidity of 85 percent, by applying a reference voltage for six hours. A sample having insulation resistance of 1.0 E+5 or less was determined to be a defective sample. The number of defective samples is shown in Tables (1), (2), and (3).

TABLE (1)

| Test No. | Thickness of Dielectric Layer (μm) | Thickness of Internal Electrode (μm) | Thickness of Cover Portion (μm) | Thickness of Ni—Sn IMC Layer (μm) | Number of Poor Moisture-Resistance |
|---|---|---|---|---|---|
| 1 | 0.6 | 0.5 | 35 | 0 | 0/400 |
| 2 | 0.5 | 0.5 | 35 | 0 | 0/400 |
| 3 | 0.45 | 0.5 | 35 | 0 | 0/400 |
| 4 | 0.42 | 0.5 | 35 | 0 | 0/400 |
| 5 | 0.4 | 0.5 | 35 | 0 | 3/400 |
| 6 | 0.38 | 0.5 | 35 | 0 | 5/400 |
| 7 | 0.4 | 0.5 | 35 | 0.05 | 0/400 |
| 8 | 0.38 | 0.5 | 35 | 0.05 | 2/400 |
| 9 | 0.4 | 0.5 | 35 | 0.1 | 0/400 |
| 10 | 0.38 | 0.5 | 35 | 0.1 | 0/400 |
| 11 | 0.4 | 0.5 | 35 | 0.2 | 0/400 |
| 12 | 0.38 | 0.5 | 35 | 0.2 | 0/400 |
| 13 | 0.4 | 0.5 | 35 | 0.5 | 0/400 |
| 14 | 0.38 | 0.5 | 35 | 0.5 | 0/400 |
| 15 | 0.4 | 0.5 | 35 | 1 | 0/400 |
| 16 | 0.38 | 0.5 | 35 | 1 | 0/400 |
| 17 | 0.4 | 0.5 | 35 | 3 | 0/400 |
| 18 | 0.38 | 0.5 | 35 | 3 | 0/400 |

As can be seen from Table (1), excellent moisture-resistance reliability was found in test numbers 1 to 4 in which a thickness of a dielectric layer is more than 0.4 μm although no Ni—Sn IMC layer exists.

However, poor moisture-resistance reliability was found in test numbers 5 and 6 in which a thickness of a dielectric layer is 0.4 μm or less and no Ni—Sn IMC layer exists.

Additionally, poor moisture-resistance reliability was also found in a test number 8 in which a thickness of a dielectric layer is 0.4 μm or less and a thickness of a Ni—Sn IMC layer is less than 0.1 μm.

Accordingly, the thickness of the Ni—Sn IMC layer should be 0.1 μm or more to stably secure moisture-resistance reliability when the thickness of the dielectric layer is 0.4 μm or less.

TABLE (2)

| Test No. | Thickness of Dielectric Layer (μm) | Thickness of Internal Electrode (μm) | Thickness of Cover Portion (μm) | Thickness of Ni—Sn IMC Layer (μm) | Number of Poor Moisture-Resistance |
|---|---|---|---|---|---|
| 19 | 0.5 | 0.6 | 35 | 0 | 0/400 |
| 20 | 0.5 | 0.5 | 35 | 0 | 0/400 |
| 21 | 0.5 | 0.45 | 35 | 0 | 0/400 |
| 22 | 0.5 | 0.42 | 35 | 0 | 0/400 |
| 23 | 0.5 | 0.4 | 35 | 0 | 1/400 |
| 24 | 0.5 | 0.38 | 35 | 0 | 1/400 |
| 25 | 0.5 | 0.4 | 35 | 0.05 | 0/400 |
| 26 | 0.5 | 0.38 | 35 | 0.05 | 0/400 |
| 27 | 0.5 | 0.4 | 35 | 0.1 | 0/400 |
| 28 | 0.5 | 0.38 | 35 | 0.1 | 0/400 |
| 29 | 0.5 | 0.4 | 35 | 0.2 | 0/400 |
| 30 | 0.5 | 0.38 | 35 | 0.2 | 0/400 |
| 31 | 0.5 | 0.4 | 35 | 0.5 | 0/400 |
| 32 | 0.5 | 0.38 | 35 | 0.5 | 0/400 |
| 33 | 0.5 | 0.4 | 35 | 1 | 0/400 |
| 34 | 0.5 | 0.38 | 35 | 1 | 0/400 |
| 35 | 0.5 | 0.4 | 35 | 3 | 0/400 |
| 36 | 0.5 | 0.38 | 35 | 3 | 0/400 |

As can be seen from Table (2), excellent moisture-resistance reliability was found in test numbers 19 to 22 in which a thickness of an internal electrode is more than 0.4 μm although no Ni—Sn IMC layer exists.

However, poor moisture-resistance reliability was found in test numbers 23 and 24 in which a thickness of an internal electrode is 0.4 μm or less and no Ni—Sn IMC layer exists.

Test numbers 25-36 show that a Ni—Sn IMC layer may stably secure moisture-resistance reliability when the thickness of the internal electrode is 0.4 μm or less and the thickness of the cover portion is 35 μm.

TABLE (3)

| Test No. | Thickness of Dielectric Layer (μm) | Thickness of Internal Electrode (μm) | Thickness of Cover Portion (μm) | Thickness of Ni—Sn IMC Layer (μm) | Number of Poor Moisture-Resistance |
|---|---|---|---|---|---|
| 37 | 0.5 | 0.5 | 35 | 0 | 0/400 |
| 38 | 0.5 | 0.5 | 25 | 0 | 0/400 |
| 39 | 0.5 | 0.5 | 20 | 0 | 2/400 |
| 40 | 0.5 | 0.5 | 15 | 0 | 3/400 |
| 41 | 0.5 | 0.5 | 20 | 0.05 | 0/400 |
| 42 | 0.5 | 0.5 | 15 | 0.05 | 1/400 |
| 43 | 0.5 | 0.5 | 20 | 0.1 | 0/400 |
| 44 | 0.5 | 0.5 | 15 | 0.1 | 0/400 |
| 45 | 0.5 | 0.5 | 20 | 0.2 | 0/400 |
| 46 | 0.5 | 0.5 | 15 | 0.2 | 0/400 |
| 47 | 0.5 | 0.5 | 20 | 0.5 | 0/400 |
| 48 | 0.5 | 0.5 | 15 | 0.5 | 0/400 |
| 49 | 0.5 | 0.5 | 20 | 1 | 0/400 |
| 50 | 0.5 | 0.5 | 15 | 1 | 0/400 |
| 51 | 0.5 | 0.5 | 20 | 3 | 0/400 |
| 52 | 0.5 | 0.5 | 15 | 3 | 0/400 |

As can be seen from Table (3), excellent moisture-resistance reliability was found in test numbers 37 and 38 in which a thickness of a dielectric layer is more than 20 μm although no Ni—Sn IMC layer exists.

However, poor moisture-resistance reliability was found in test numbers 39 and 40 in which a thickness of a dielectric layer is 20 μm or less and no Ni—Sn IMC layer exists.

Additionally, poor moisture-resistance reliability was also found in a test number 42 in which a thickness of a dielectric layer is 20 μm or less and a thickness of a Ni—Sn IMC layer is less than 0.1 μm.

Accordingly, the thickness of the Ni—Sn IMC layer should be 0.1 μm or more to stably secure moisture-resistance reliability when the thickness of the dielectric layer is 20 μm or less.

Figure 4:
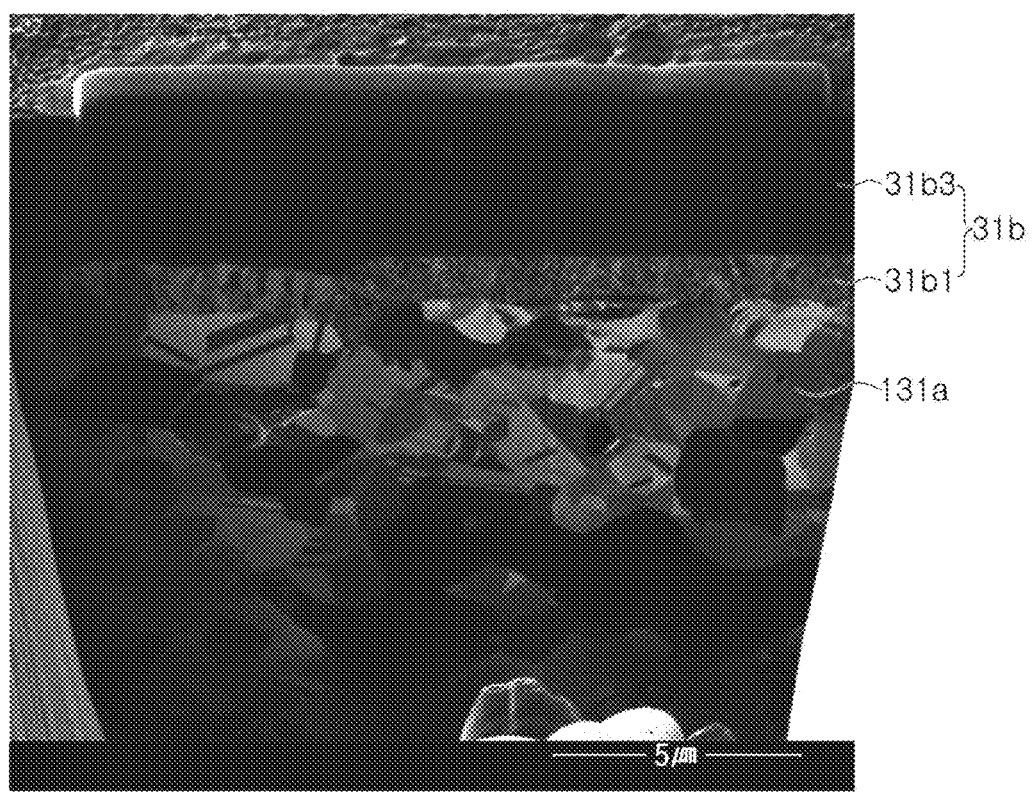
FIG. 4 is a captured image of a conventional plating portion in which a nickel-tin (Ni—Sn) intermetallic compound layer is not formed.

FIG. 4 is a captured image of a conventional plating portion in which a nickel-tin (Ni—Sn) intermetallic compound layer is not formed.

Figure 5:
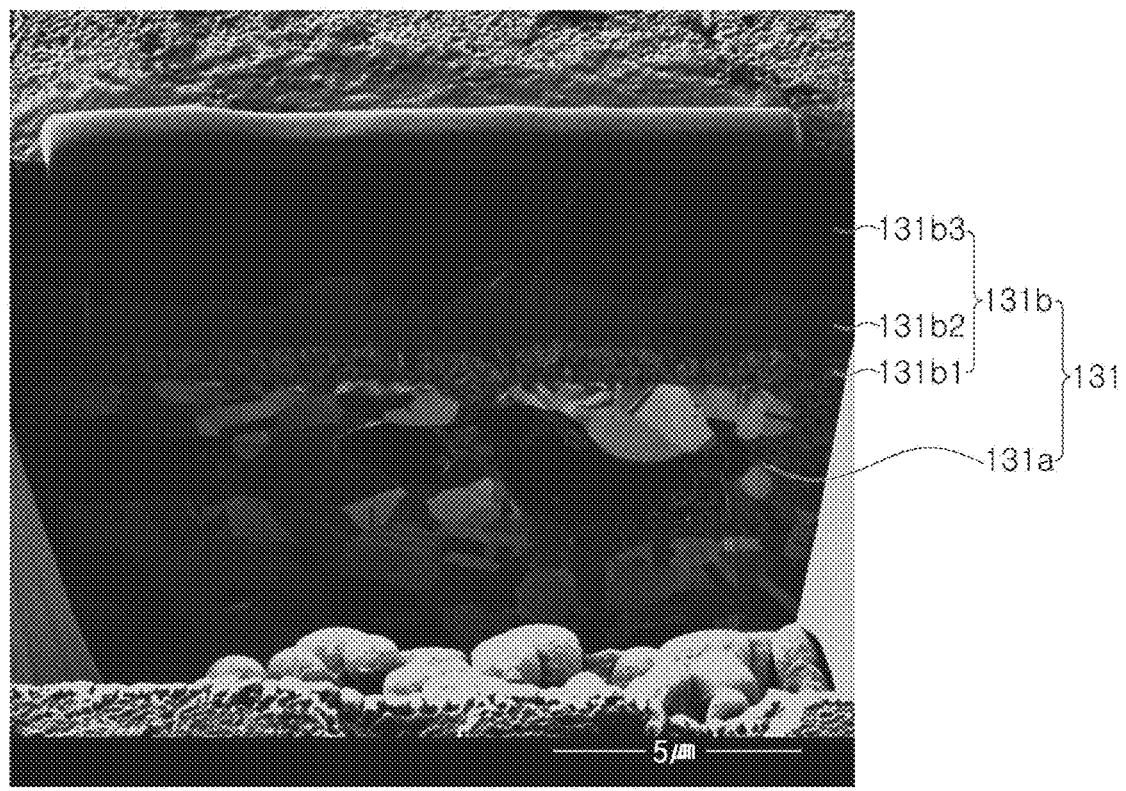
FIG. 5 is a captured image of a plating portion in which a nickel-tin (Ni—Sn) intermetallic compound layer is formed to have a thickness of 0.1 µm or more according to an exemplary embodiment in the present disclosure.

FIG. 5 is a captured image of a plating portion in which a nickel-tin (Ni—Sn) intermetallic compound layer is formed to have a thickness of 0.1 µm or more according to an exemplary embodiment in the present disclosure.

As shown in FIG. 4, a conventional plating portion 31b has a structure in which a nickel (Ni) plating layer 31b1 and a tin (Sn) plating layer 31b3 are sequentially disposed on an electrode layer 131a.

On the other hand, as shown in FIG. 5, a plating portion 131b according to an exemplary embodiment has a structure in which a nickel (Ni) plating layer 131b1, a nickel-tin (Ni—Sn) intermetallic compound layer 131b2, and a tin (Sn) plating layer 131b3 are sequentially disposed on an electrode layer 131a.

Figure 6:
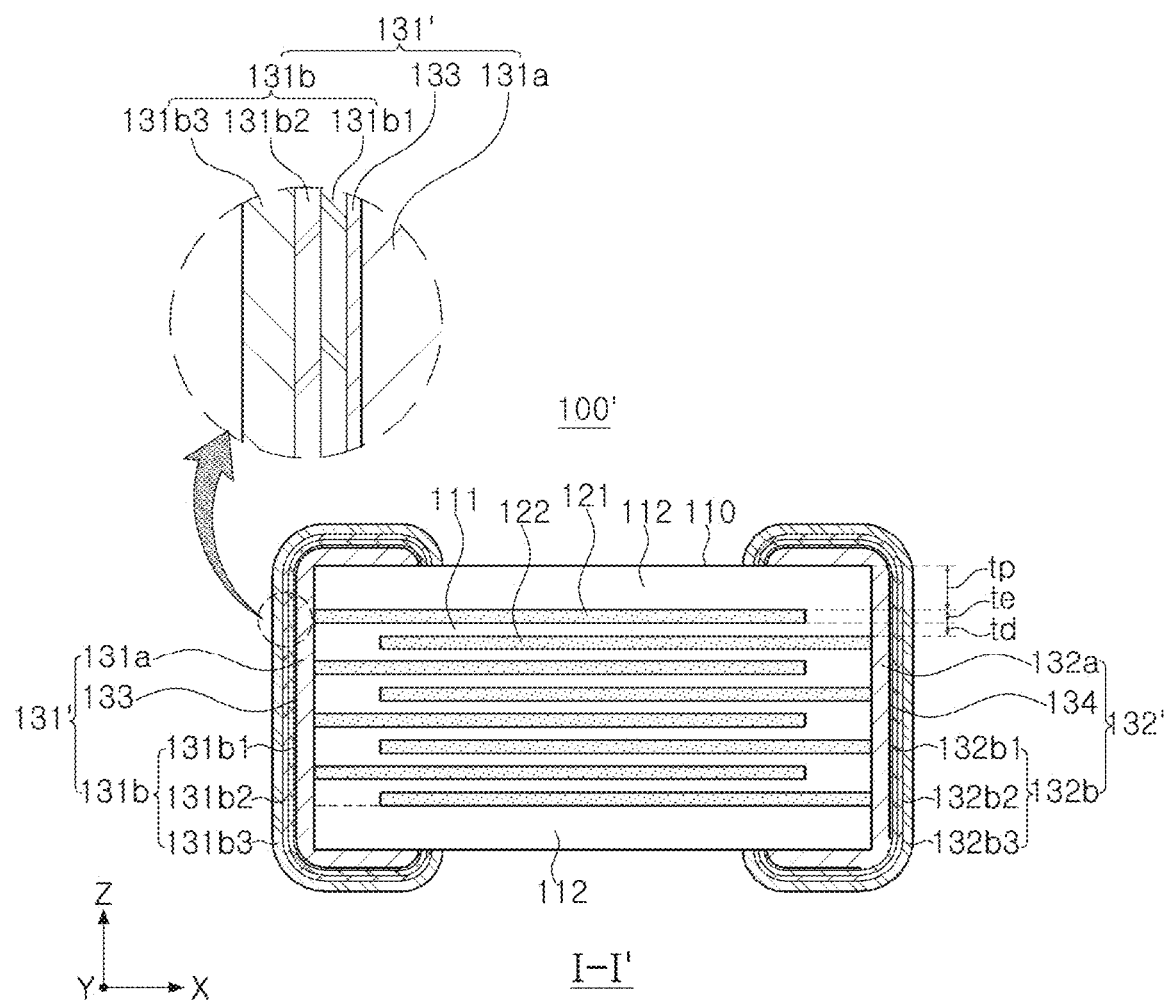
FIG. 6 is a cross-sectional view of a modified example of the multilayer ceramic capacitor shown in FIG. 2.

FIG. 6 shows a cross-sectional view of a modified example of the multilayer ceramic capacitor shown in FIG. 2.

Referring to FIG. 6, an external electrode 131' of a multilayer ceramic capacitor 100' according to the modified example may further include another Sn plating layer 133 provided on a boundary between an electrode layer 131a and a Ni plating layer 131b1, and an external electrode 132' of the multilayer ceramic capacitor 100' may further include another Sn plating layer 134 provided on a boundary between an electrode layer 132a and a Ni plating layer 132b1. Since Sn is horizontally grown during plating and has excellent ductility, the Sn plating layers 133 and 134 provided on the boundaries between the electrode layers 131a and 132a and the Ni plating layers 131b1 and 132b1 may serve to suppress plating disconnection of the Ni plating layers 131b1 and 132b1.

Each of the Sn plating layers 133 and 134 provided on the boundaries between the electrode layers 131a and 132a and the Ni plating layers 131b1 and 132b1 may have a thickness of 0.3 µm to 1 µm.

When a Sn plating layer provided on a boundary between an electrode layer and a Ni plating layer may have a thickness less than 0.3 µm, the Sn plating layer may not serve to sufficiently suppress the plating disconnection of the Ni plating layer. Since an external electrode increases in thickness when a Sn plating layer provided on a boundary between an electrode layer and a Ni plating layer has a thickness more than 1 µm, a multilayer ceramic capacitor may increase in volume. Further, as capacitance per unit volume decreases, there may be disadvantages to miniaturization and high capacitance.

A description of other configurations overlaps those described above with reference to FIGS. 1-3 and is thus omitted.

Figure 7:
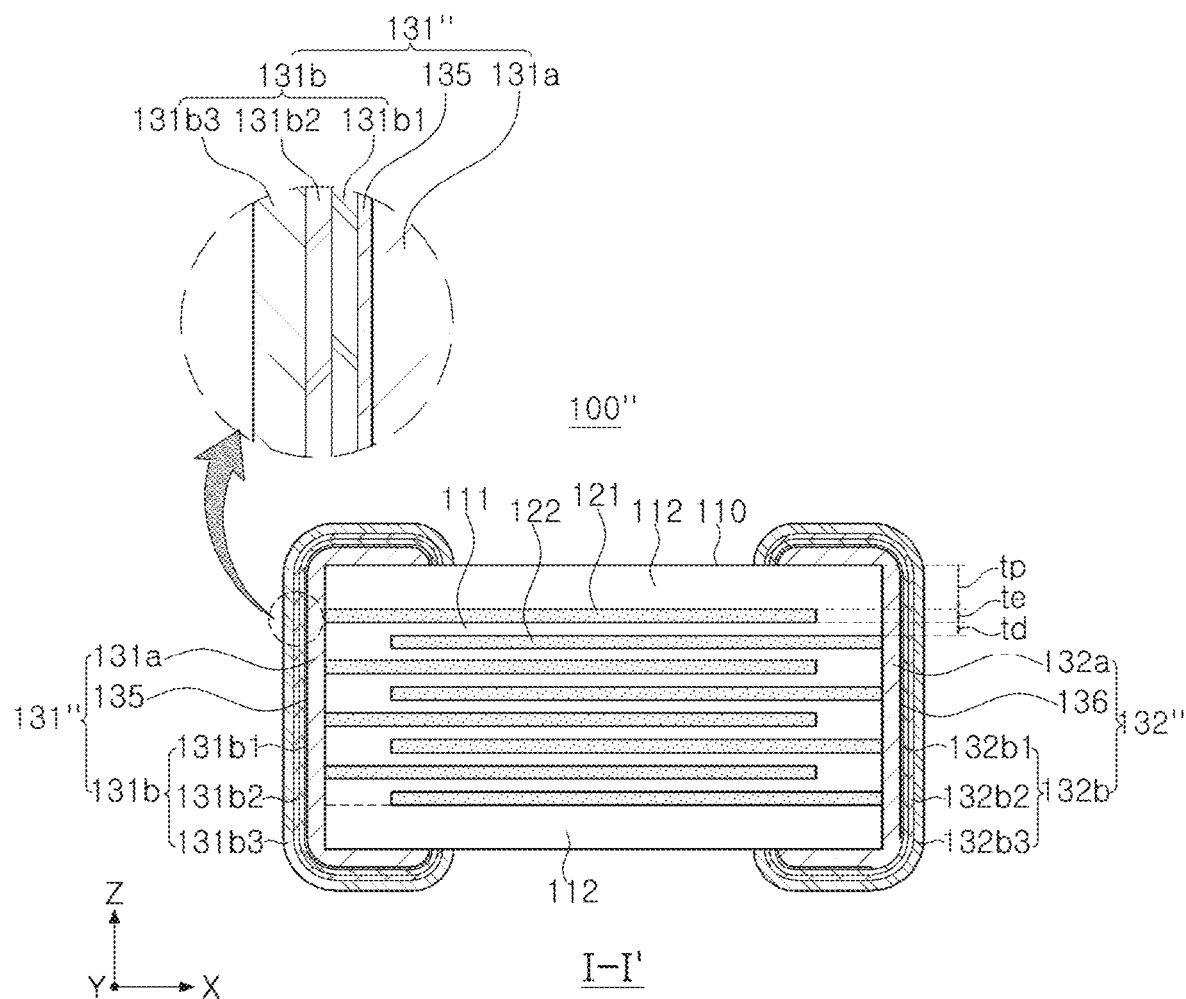
FIG. 7 is a cross-sectional view of another modified example of the multilayer ceramic capacitor shown in FIG. 2.

FIG. 7 shows a cross-sectional view of another modified example of the multilayer ceramic capacitor shown in FIG. 2.

Referring to FIG. 7, an external electrode 131" of a multilayer ceramic capacitor 100" according to another modified example may further include a Cu—Ni intermetallic compound layer 135 provided on the boundary between the electrode layer 131a and the Ni plating layer 131b1, and an external electrode 132" of the multilayer ceramic capacitor 100" may further include a Cu—Ni intermetallic compound layer 136 provided on the boundary between the electrode layer 132a and the Ni plating layer 132b1. The Cu—Ni intermetallic compound layers 135 and 136 may be formed by interdiffusing Cu contained in the electrode layers 131a1 and 132a2 and Ni contained in the Ni plating layer 131b1 and 132b1 during a separate annealing or reflow process to form the Ni—Sn intermetallic compound layers 131b2 and 132b2. A description of other configurations overlaps those described above with reference to FIGS. 1-3 and is thus omitted.

There is no need to limit a size of the multilayer ceramic capacitor 100.

However, since the number of laminations should be increased by thinning a dielectric layer and an internal electrode to achieve miniaturization as well as high capacitance, moisture-resistance reliability may be significantly improved in a multilayer ceramic capacitor having a size of 0402 (0.4 mm×0.2 mm) or less.

Accordingly, when a distance between third and fourth sides of a body is defined as L and a distance between fifth and sixth sides of the body is defined as W, the L may be 0.4 mm or less and the W may be 0.2 mm or less.

For example, a multilayer ceramic capacitor may have a size of 0402 (0.4 mm×0.2 mm) or less.

As described above, according to an exemplary embodiment, a nickel-tin (Ni—Sn) intermetallic compound layer having a thickness of 0.1 µm or more may be provided on a boundary between a Ni plating layer and a Sn plating layer to provide a multilayer ceramic capacitor having excellent moisture-resistance reliability.

While exemplary embodiments have been shown and described above, it will be apparent to those skilled in the art that modifications and variations could be made without departing from the scope of the present invention as defined by the appended claims.

What is claimed is:

1. A multilayer ceramic capacitor comprising:
    a body including a dielectric layer and an internal electrode; and
    an external electrode disposed on an exterior of the body, wherein the external electrode comprises:
        an electrode layer connected to the internal electrode; and
        a plating portion including a nickel (Ni) plating layer, a nickel-tin (Ni—Sn) intermetallic compound layer, and a tin (Sn) plating layer, sequentially disposed on the electrode layer,
    the Ni—Sn intermetallic compound layer, consisting of Ni—Sn intermetallic compound, has a thickness of 0.1 µm or more and has a shape of substantially continuous layer.

2. The multilayer ceramic capacitor of claim 1, wherein the Ni—Sn intermetallic compound layer has a thickness ranging from 0.1 µm to 5 µm.

3. The multilayer ceramic capacitor of claim 1, wherein the electrode layer includes a conductive metal and a glass.

4. The multilayer ceramic capacitor of claim 3, wherein the conductive metal is copper (Cu).

5. The multilayer ceramic capacitor of claim 4, further comprising:
    a copper-nickel (Cu—Ni) intermetallic compound layer disposed between the electrode layer and the Ni plating layer.

6. The multilayer ceramic capacitor of claim 1, further comprising:
    another tin (Sn) plating layer disposed between the electrode layer and the Ni plating layer.

7. The multilayer ceramic capacitor of claim 6, wherein the another Sn plating layer has a thickness ranging from 0.3 µm to 1 µm.

8. The multilayer ceramic capacitor of claim 1, wherein the Ni plating layer has a thickness ranging from 0.5 µm to 10 µm, and the Sn plating layer has a thickness ranging from 0.5 µm to 10 µm.

9. The multilayer ceramic capacitor of claim 1, wherein the internal electrode has a thickness of 0.4 μm or less.

10. The multilayer ceramic capacitor of claim 1, wherein the body includes a capacitance forming portion including a first internal electrode and a second internal electrode disposed to face each other with the dielectric layer interposed therebetween, and cover portions respectively disposed above and below the capacitance forming portion, the cover portions each having a thickness of 20 μm or less.

11. A multilayer ceramic capacitor comprising:
a body including dielectric layers and first and second internal electrodes alternately disposed with the dielectric layers interposed therebetween, the capacitor body having first and second surfaces opposing each other, third and fourth surfaces connected to the first and second surfaces and opposing each other, and fifth and sixth surfaces connected to the first and second surfaces, connected to the third and fourth surfaces and opposing each other, one ends of the first and second internal electrodes being exposed from the third and fourth surfaces, respectively;
first and second external electrodes disposed on the third and fourth surfaces of the body, respectively;
wherein the first external electrode comprises:
an electrode layer connected to the internal electrode; and
a plating portion including a nickel (Ni) plating layer, a nickel-tin (Ni—Sn) intermetallic compound layer consisting of Ni—Sn intermetallic compound and having a thickness of 0.1 μm or more, and a tin (Sn) plating layer, sequentially disposed on the electrode layer,
the intermetallic compound layer covers each of the one ends of the first internal electrodes and has a shape of substantially continuous layer.

12. The multilayer ceramic capacitor of claim 11, wherein the Ni—Sn intermetallic compound layer has a thickness ranging from 0.1 μm to 5 μm.

13. The multilayer ceramic capacitor of claim 11, wherein the electrode layer includes a conductive metal and a glass.

14. The multilayer ceramic capacitor of claim 13, wherein the conductive metal is copper (Cu).

15. The multilayer ceramic capacitor of claim 14, wherein the first external electrode further comprises a copper-nickel (Cu—Ni) intermetallic compound layer disposed between the electrode layer and the Ni plating layer.

16. The multilayer ceramic capacitor of claim 11, wherein the first external electrode further another tin (Sn) plating layer disposed between the electrode layer and the Ni plating layer.

17. The multilayer ceramic capacitor of claim 16, wherein the another Sn plating layer has a thickness ranging from 0.3 μm to 1 μm.

18. The multilayer ceramic capacitor of claim 11, wherein the Ni plating layer has a thickness ranging from 0.5 μm to 10 μm and the Sn plating layer has a thickness ranging from 0.5 μm to 10 μm.

19. The multilayer ceramic capacitor of claim 11, wherein each of the first and second internal electrodes has a thickness of 0.4 μm or less.

20. A multilayer ceramic capacitor comprising:
a body including a dielectric layer and an internal electrode, the internal electrode being exposed from a first surface of the body; and
an external electrode including a connection portion disposed the first surface of the body, and a band portion disposed on at least one of a second surface and a third surface of the body, the second and third surfaces connected to each other by the first surface and opposing each other in a direction in which the dielectric layer and the internal electrode are stacked,
wherein the external electrode comprises:
an electrode layer connected to the internal electrode; and
a plating portion including a nickel (Ni) plating layer, a nickel-tin (Ni—Sn) intermetallic compound layer consisting of Ni—Sn intermetallic compound and having a thickness of 0.1 μm or more, and a tin (Sn) plating layer, sequentially disposed on the electrode layer,
the Ni—Sn intermetallic compound layer is disposed on the first surface and extends onto the at least one of the second surface and the third surface of the body, and
the Ni—Sn intermetallic compound layer has a shape of substantially continuous layer.

21. The multilayer ceramic capacitor of claim 1, wherein the tin (Sn) plating layer is in direct contact with the body.

22. The multilayer ceramic capacitor of claim 1, wherein the dielectric layer has a thickness of 0.4 μm or less.

23. The multilayer ceramic capacitor of claim 11, wherein one of the dielectric layers has a thickness of 0.4 μm or less.

24. The multilayer ceramic capacitor of claim 20, wherein the dielectric layer has a thickness of 0.4 μm or less.

* * * * *